United States Patent
Oishi et al.

(10) Patent No.: US 9,606,421 B2
(45) Date of Patent: Mar. 28, 2017

(54) FOCAL-PLANE SHUTTER AND OPTICAL DEVICE

(71) Applicant: SEIKO PRECISION INC., Narashino-shi (JP)

(72) Inventors: Seiichi Oishi, Narashino (JP); Hiroshi Takahashi, Narashino (JP); Shoichi Tokura, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 15/088,589

(22) Filed: Apr. 1, 2016

(65) Prior Publication Data

US 2016/0216593 A1 Jul. 28, 2016

Related U.S. Application Data

(63) Continuation of application No. PCT/JP2014/078227, filed on Oct. 23, 2014.

(30) Foreign Application Priority Data

Jan. 6, 2014 (JP) ................................. 2014-000653

(51) Int. Cl.
*G03B 9/40* (2006.01)
*G03B 9/42* (2006.01)

(52) U.S. Cl.
CPC ........ *G03B 9/40* (2013.01); *G03B 9/42* (2013.01)

(58) Field of Classification Search
CPC .................................... G03B 9/40; G03B 9/42
See application file for complete search history.

(56) References Cited

U.S. PATENT DOCUMENTS

| 5,664,247 | A | * | 9/1997 | Hasuda | G03B 9/18 396/456 |
| 8,356,949 | B2 | * | 1/2013 | Takahashi | G03B 9/36 396/456 |
| 2002/0136555 | A1 | * | 9/2002 | Watabe | G03B 9/08 396/453 |
| 2012/0177359 | A1 | * | 7/2012 | Takahashi | G03B 9/36 396/456 |
| 2012/0183287 | A1 | | 7/2012 | Takahashi | |
| 2014/0248046 | A1 | | 9/2014 | Takahashi | |

(Continued)

FOREIGN PATENT DOCUMENTS

| JP | H08-248476 | | 9/1996 |
| JP | 2011-170226 | A1 | 9/2011 |
| JP | 2013-145361 | A1 | 7/2013 |

OTHER PUBLICATIONS

International Search Report for International Application No. PCT/JP2014/078227 dated Jan. 27, 2015.

*Primary Examiner* — W B Perkey
(74) *Attorney, Agent, or Firm* — Kratz, Quintos & Hanson, LLP (57) ABSTRACT

A focal-plane shutter includes: a board including an opening; a shutter opening and closing the opening; a drive lever provided with a drive pin and swinging; a drive arm provided with an engagement hole engaged with the drive pin, swinging about a center same as a swing center of the drive lever, driving the shutter, and made of a synthetic resin; and a restriction portion defining a swinging range of the drive lever.

6 Claims, 9 Drawing Sheets

(56) References Cited

U.S. PATENT DOCUMENTS

| | | | | |
|---|---|---|---|---|
| 2014/0376904 A1* | 12/2014 | Oishi | ................. | G03B 9/40 |
| | | | | 396/456 |
| 2015/0234257 A1* | 8/2015 | Takahashi | ................. | G03B 9/42 |
| | | | | 396/489 |
| 2015/0253646 A1* | 9/2015 | Oishii | ................. | G03B 9/42 |
| | | | | 396/470 |
| 2016/0216593 A1* | 7/2016 | Oishi | ................. | G03B 9/40 |

* cited by examiner

FOCAL-PLANE SHUTTER AND OPTICAL DEVICE

CROSS-REFERENCE TO RELATED APPLICATION

This application is a continuation of and claims priority to International Patent Application No. PCT/JP2014/078227 filed on Oct. 23, 2014, which claims priority to Japanese Patent Application No. 2014-000653 filed on Jan. 6, 2014, subject matter of these patent documents is incorporated by reference herein in its entirety.

BACKGROUND (i) Technical Field

The present invention relates to focal-plane shutters and optical devices.

(ii) Related Art

There is known a focal-plane shutter equipped with a buffering member absorbing the impact caused by stopping of a shutter. For example, the buffering member is provided to abut the shutter at a stop position thereof. Such a focal-plane shutter is disclosed in Japanese Unexamined Patent Application Publication No. 2011-170226.

A drive pin of a drive lever is engaged with an engagement hole of a drive arm, and the drive arm drives in response to swinging of the drive lever. A swinging range of the drive lever is restricted by a predetermined restriction portion. Even after the swinging drive lever abuts the restriction portion and stops, the inertia force exerting on the drive arm pushes an edge of the engagement hole of the drive arm to the drive pin of the drive lever. Therefore, depending on a material of the drive arm, the edge of the engagement hole of the drive arm might be deformed.

Conceivably, the way to solve such a problem is to thick the shutter or to change material thereof to harder one.

Incidentally, in order to increase speed of the shutter driven by the drive lever, or in order to reduce a drive current of an electromagnetic actuator driving the drive lever, it is required to thin the shutter for weight reduction or to use a synthetic resin-made shutter in some cases.

When the shutter is thinned to prevent the deformation, the weight increases. This might not increase the drive speed of the shutter or this might increase the drive current.

Further, when the material of the arm is changed to a rigid one to prevent the deformation of the engagement hole of the arm, the weight of the arm increases depending on the material. This might not increase the speed or this might not decrease the drive current. Also, even when the speed can be increased or the drive current can be decreased, the manufacturing cost might increase.

SUMMARY

It is therefore an object to provide a focal-plane shutter and an optical device suppressing increases in weight of an drive arm, in manufacturing cost, and in drive current, and suppressing deformation of an engagement hole of the drive arm.

According to an aspect of the present invention, there is provided a focal-plane shutter including: a board including an opening; a shutter opening and closing the opening; a drive lever provided with a drive pin and swinging; a drive arm provided with an engagement hole engaged with the drive pin, swinging about a center same as a swing center of the drive lever, driving the shutter, and made of a synthetic resin; and a restriction portion defining a swinging range of the drive lever, wherein the engagement hole includes: a first edge portion at a start end side from which the drive lever moves in a predetermined direction; and a second edge portion at a terminal end side to which the drive lever moves in the predetermined direction, the drive pin includes first and second side surfaces respectively capable of abutting the first edge portion and the second edge portion, and the first edge portion and the first side surface are not parallel to or perpendicular to any one of virtual lines capable of passing from the swing center to the drive pin when viewed in an axial direction of the swing center.

DETAILED DESCRIPTION

Figure 1:
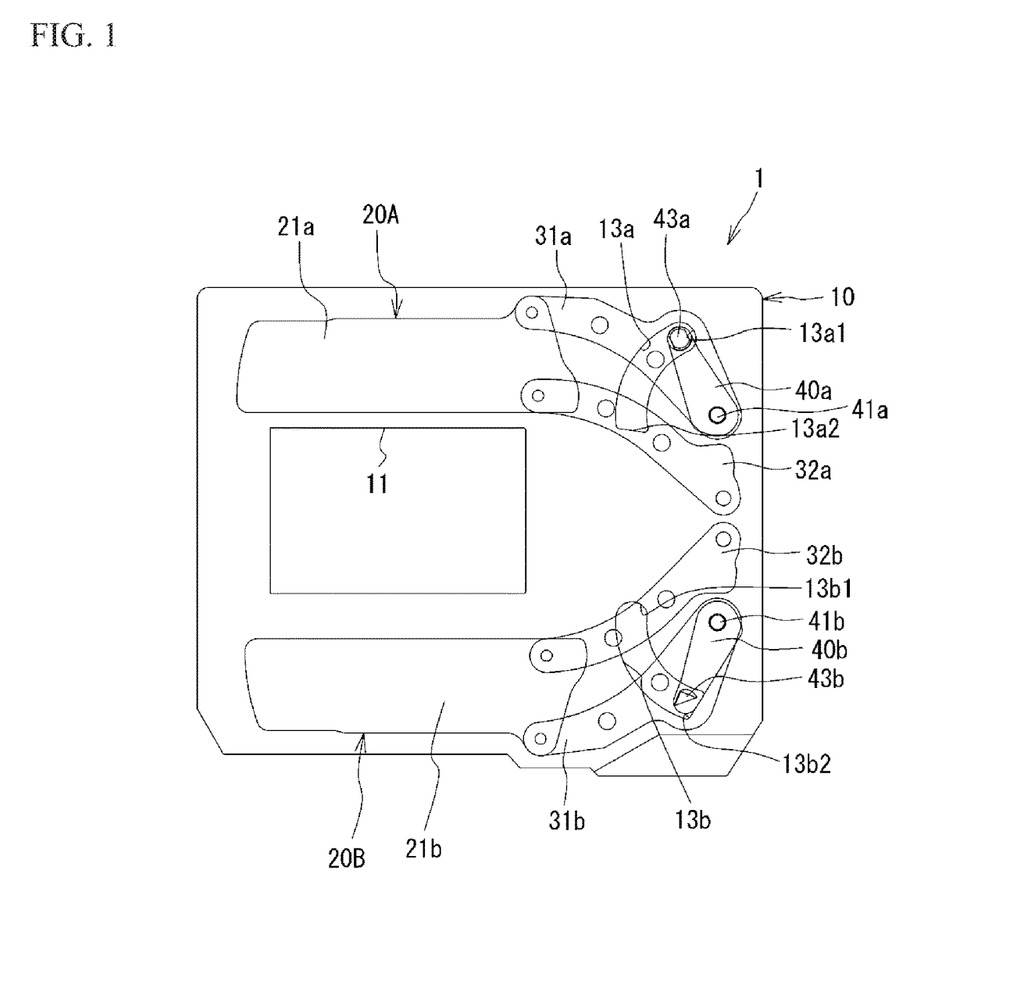
FIG. 1 is a front view of a focal-plane shutter according to the present embodiment.
Figure 2:
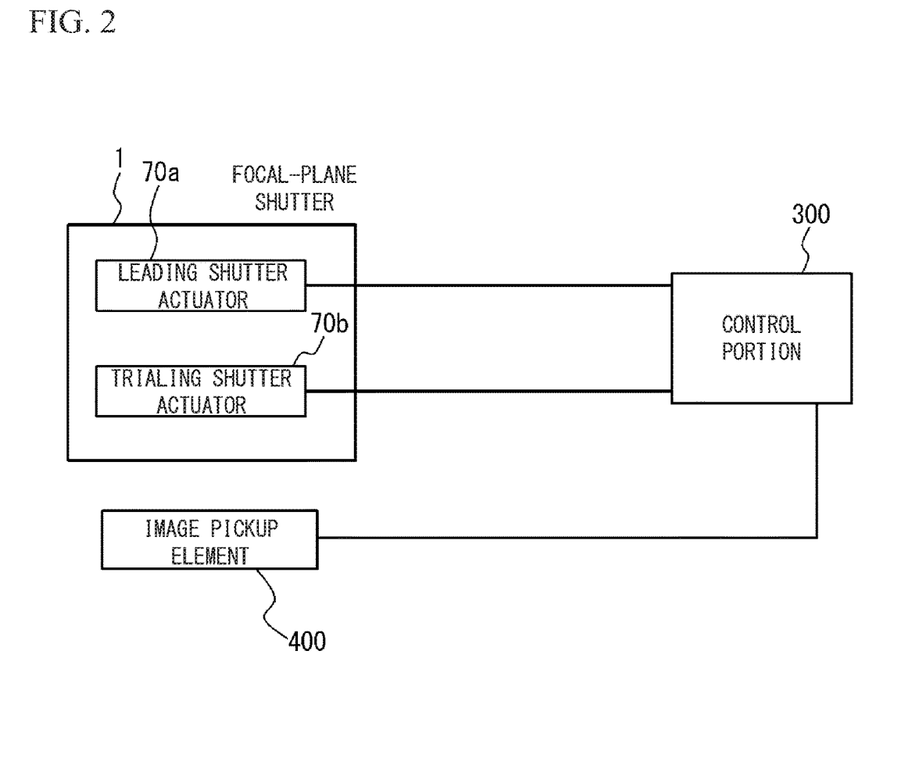
FIG. 2 is a block diagram of a camera including the focal-plane shutter.
Figure 3A:
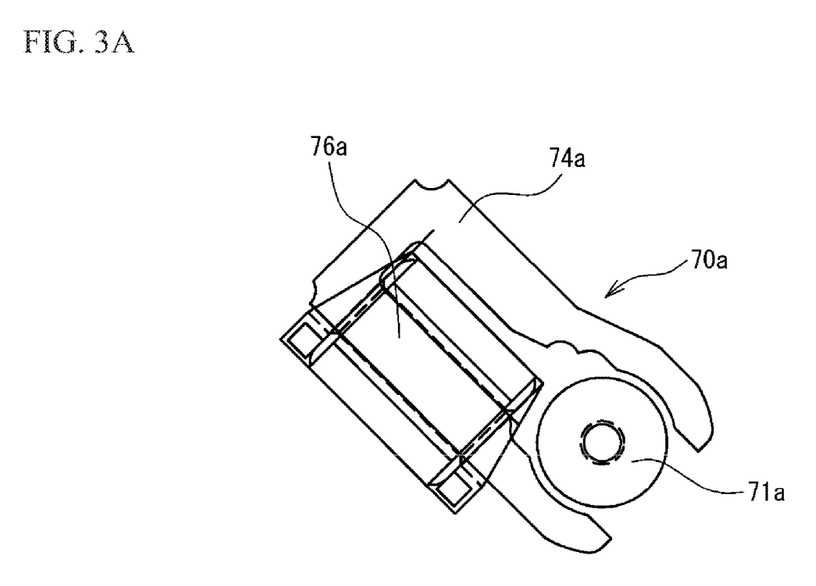
FIGS. 3A and 3B are respective explanatory views of a leading shutter actuator and a trailing shutter actuator.
Figure 3B:
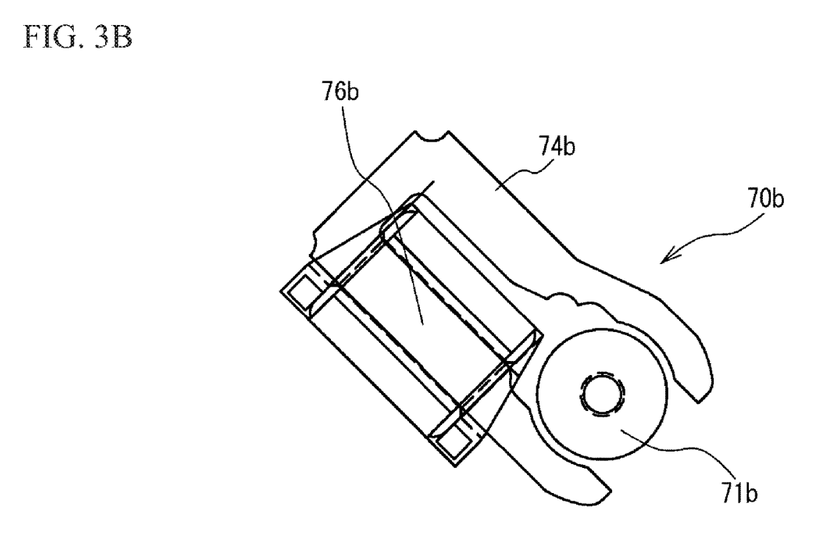

In the following, the embodiment will be described with reference to drawings. FIG. 1 is a front view of a focal-plane shutter 1 according to the present embodiment. FIG. 2 is a block diagram of a camera including the focal-plane shutter 1. FIGS. 3A and 3B are respective explanatory views of a leading shutter actuator 70a and a trailing shutter actuator 70b. The focal-plane shutter 1 includes: a board 10 including an opening 11; a leading shutter 20A and a trailing shutter 20B opening and closing the opening 11; an arm 31a and an assist arm 32a for driving the leading shutter 20A; and an arm 31b and an assist arm 32b for driving the trailing shutter 20B. The arm 31b is an example of a drive arm.

The board 10 is made of a synthetic resin, and includes the opening 11 having a rectangular shape. Although the leading shutter 20A and the trailing shutter 20B each include plural blades, blades 21a and 21b are only illustrated and other blades are omitted in FIG. 1. Each of the blades 21a and 21b is made of a synthetic resin, and is formed into a thin shape. Further, the arms 31a and 31b and assist arms 32a and 32b have a thin plate shape and are made of a synthetic resin such as polyethylene terephthalate. These arms are swingably supported by the board 10.

The focal-plane shutter 1 includes a leading shutter actuator 70a (hereinafter, referred to as actuator) and a trailing shutter actuator 70b (hereinafter, referred to as actuator) as respective drive sources driving the leading shutter 20A and the trailing shutter 20B. The actuators 70a and 70b respectively include rotors 71a and 71b that are rotatable within a predetermined range in both directions. The actuators 70a and 70b will be described later in detail. The rotors 71a and 71b are respectively secured with a leading shutter drive lever (hereinafter referred to as a drive lever) 40a and a trailing shutter drive lever (hereinafter referred to as a drive lever) 40b serving as drive members.

The rotation of the rotor 71a causes the drive lever 40a to swing about a spindle portion 41a within a predetermined range. The spindle portion 41a of the drive lever 40a is rotatably supported by the board 10. The drive lever 40a is formed with a drive pin 43a at its end. The drive pin 43a is fitted into an engagement hole of the arm 31a. Further, the board 10 is formed with an escape slot 13a releasing the drive pin 43a and having an arc shape. The abutment of the drive pin 43a with end portions 13a1 and 13a2 of the escape slot 13a restricts the swingable range of the drive lever 40a.

In the state where the leading shutter 20A recedes away from the opening 11, the drive pin 43a of the drive lever 40a abuts the end portion 13a1. In the state where the leading shutter 20A closes the opening 11, the drive pin 43a of the drive lever 40a abuts the end portion 13a2.

Likewise, the drive lever 40b includes a drive pin 43b fitting into an engagement hole of the arm 31b, and the drive pin 43b abuts end portions 13b1 and 13b2 of an escape slot 13b to restrict the swinging range of the drive lever 40b. In the state where the trailing shutter 20B recedes from the opening 11, the drive pin 43b of the drive lever 40b abuts the end portion 13b2. In the state where the trailing shutter 20B closes the opening 11, the drive pin 43b of the drive lever 40b abuts the end portion 13b1. The escape slots 13a and 13b are examples of restriction portions respectively restricting the swinging ranges of the drive levers 40a and 40b.

The arms 31a and 31b are connected to and swingable about the spindle portions 41a and 41b of the drive levers 40a and 40b, respectively. With the above configuration, the rotation of the rotor 71a causes the drive lever 40a to swing, thereby enabling the arm 31a to swing. Therefore, the leading shutter 20A moves to open or close the opening 11. Likewise, the rotation of the rotor 71b causes the drive lever 40b to swing, thereby enabling the arm 31b to swing. Therefore, the trailing shutter 20B moves to open or close the opening 11.

Thus, the escape slots 13a and 13b respectively restrict the swinging ranges of the drive levers 40a and 40b. In other words, the escape slots 13a and 13b respectively restrict the rotational ranges of the rotors 71a and 71b. This restricts the reciprocating ranges of the leading shutter 20A and the trailing shutter 20B. In the fully opened state in FIG. 1, the drive pin 43a and 43b of the drive levers 40a and 40b respectively abut the end portions 13a2 and 13b2, so that the escape slot 13a restricts the drive lever 40a and the rotor 71a from swinging clockwise from the fully opened state in FIG. 1. The escape slot 13b restricts the drive lever 40b and the rotor 71b from swinging counterclockwise from the fully opened state in FIG. 1. Thus, in the fully opened state in FIG. 1, the leading shutter 20A and the trailing shutter 20B are restricted from further moving away from the opening 11.

A description will be given of a configuration of a camera equipped with the focal-plane shutter 1. As illustrated in FIG. 2, the camera includes: the focal-plane shutter 1; a control portion 300; and an image pickup element 400. The control portion 300 controls an operation of the whole camera and includes a CPU, a ROM, and a RAM. Additionally, the camera includes lenses, not illustrated in FIG. 2, for adjusting a focal length.

The control portion 300 controls energization states of the coils of the actuators 70a and 70b. The control portion 300 is an example of a drive control portion. The light enters the image pickup element 400 through the opening 11, and the image pickup element 400 changes an object image formed by the entered light into electric signals. The image pickup element 400 is, for example, a CCD or a CMOS.

Additionally, there is not provided a set member for respectively positioning the leading shutter 20A and the trailing shutter 20B at charging positions. This is because the leading shutter 20A and the trailing shutter 20B can be positioned at the charging positions by the rotors 71a and 71b that are rotatable in both directions.

The actuators 70a and 70b are supported on the board 10. The actuators 70a and 70b respectively drives the drive levers 40a and 40b. The actuator 70a includes a rotor 71a rotatably supported by the board 10, a stator 74a excited to generate magnetic force between the stator 74a and the rotor 71a, and a coil 76a for exciting the stator 74a. The rotor 71a is a permanent magnet that is energized to have different polarities in the circumferential direction. A rotation axis of the rotor 71a is connected to the spindle of the drive levers 40a. Accordingly, energization to the coil 76a causes the rotor 71a to rotate so that the drive lever 40a rotates. The rotation of the drive lever 40a causes the leading shutter 20A to drive. And also, opposite energization to the coil 76a causes the rotor 71a to rotate in the reverse direction so that the leading shutter 20A drive in the direction opposite to the direction described above. Likewise, as for the actuator 70b, the energization to the coil 76b causes the rotor 71b of the actuator 70b to rotate, whereby the drive lever 40b rotates, so that the trailing shutter 20B moves. Also, opposite energization to the coil 76b causes the trailing shutter 20B to move in the direction opposite to the direction mentioned above. Additionally, the rotor 71a and the drive lever 40a may be indirectly connected through a gear or the like. That is, the drive lever 40a has only to rotate in response to the rotation of the rotor 71a.

Next, a description will be given of the operation of the focal-plane shutter 1. FIG. 1 illustrates an initial state of the focal-plane shutter 1. In the initial state, as illustrated in FIG. 1, the leading shutter 20A and the trailing shutter 20B recede away from the opening 11.

A release button of the camera is pushed to start a charging operation. When the charging operation starts, the coil 76a of the actuator 70a is energized, so the leading shutter 20A moves to close the opening 11.

Figure 4:
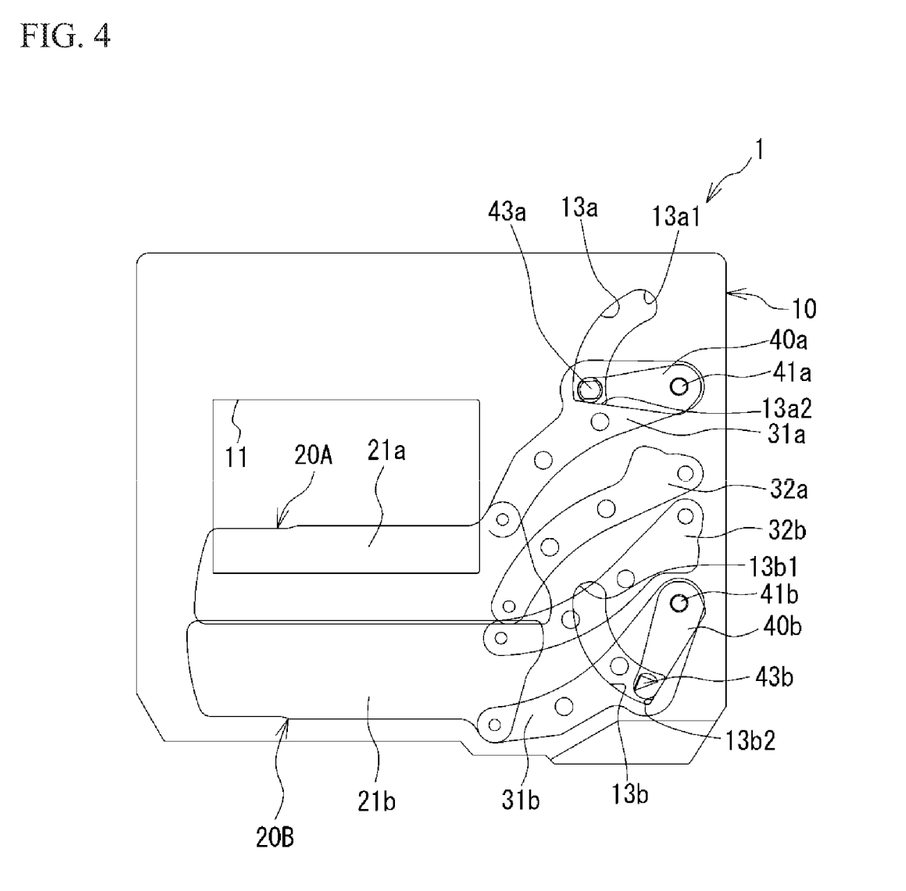
FIG. 4 is an explanatory view of an operation of the focal-plane shutter.

After that, the energization of the coils 76a and 76b of the actuators 70a and 70b is stopped in the state where the leading shutter 20A closes the opening 11 and the trailing shutter 20B are positioned away from the opening 11. In such a way, the charging operation is finished. FIG. 4 illustrates the focal-plane shutter 1 in the state where the charging operation is finished. Further, in the present embodiment, even after the energization is stopped, the charging finished state is maintained by the detent torque of the rotors 71a and 71b.

In the present embodiment, a side where the drive pin is positioned in the state where the charging operation is stopped is referred to as a start end side. Further, the other side is referred to as a terminal end side. That is, the drive pin 43b of the drive lever 40b in the trailing shutter 20B is positioned at an end portion 13b2 side in the state where the charging operation is finished. Thus, the end portion 13b2 side is the start end side of the drive lever 40b, and an end side 13b1 is the terminal end side.

Figure 5:
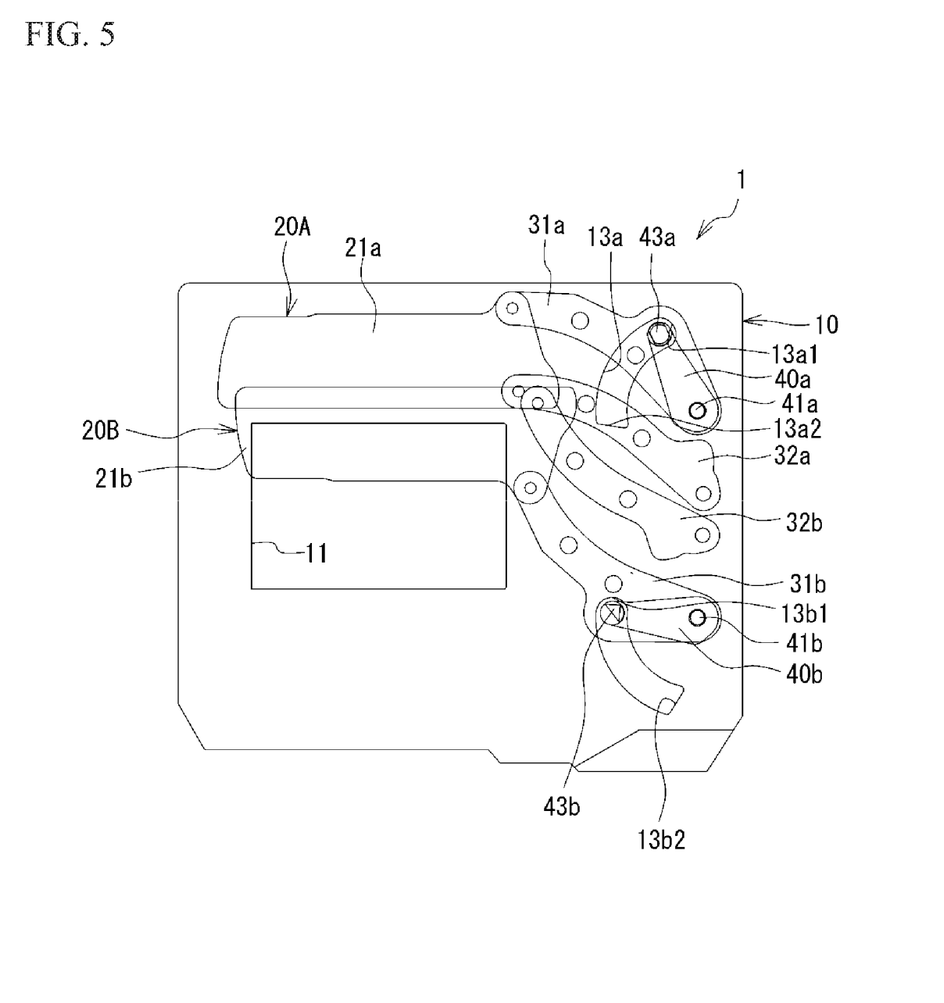
FIG. 5 is an explanatory view of an operation of the focal-plane shutter.

When a predetermined rest period elapses after the charging operation, an exposure operation starts. When the exposure operation starts, the coil 76a of the actuator 70a is energized, and the leading shutter 20A moves to open the opening 11. After a predetermined period elapses from the time when the coil 76a of the actuator 70a is energized, the coil 76a of the actuator 70b is energized, so the trailing shutter 20B moves to close the opening 11. When the leading shutter 20A moves fully away from the opening 11 and the trailing shutter 20B fully closes the opening 11, the energization of the coils 76a and 76b of the actuators 70a and 70b are stopped. In such a way, the exposure operation is finished. A period from the time when the leading shutter 20A starts moving to open the opening 11 to the time when the trailing shutter 20B fully closes the opening 11 is referred to as an exposure period. FIG. 5 illustrates the state of the focal-plane shutter 1 after the exposure operation is finished.

After the exposure operation is finished, the data are read from the image pickup element 400 by the RAM of the control portion 300 or memory of the camera side. Next, the coil 76b of the actuator 70b is energized, and the trailing shutter 20B moves away from the opening 11. Thus, the state returns to the initial state illustrated in FIG. 1.

Figure 6:
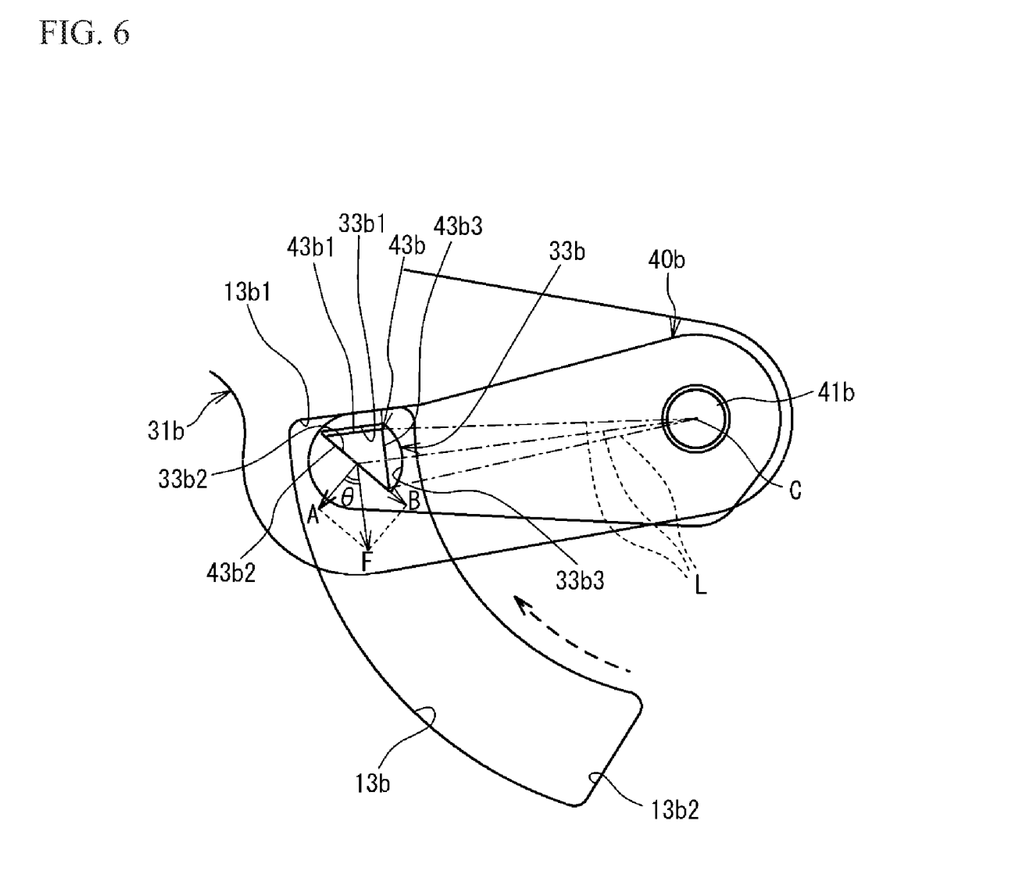
FIG. 6 is a partially enlarged view of FIG. 5.

Next, the drive pin 43b and the engagement hole 33b will be described in detail. FIG. 6 is a partially enlarged view of FIG. 5. The arm 31b is provided with the engagement hole 33b through which the drive pin 43b penetrates. The drive pin 43b has a triangular shape when viewed in the axial direction. The drive pin 43b has side surfaces 43b1 to 43b3 each having a straight shape when viewed in the axial direction. The engagement hole 33b has edge portions 33b1 to 33b3 respectively facing the side surfaces 43b1 to 43b3. Although the edge portion 33b3 has a curved shape, the edge portions 33b1 and 33b2 each has a straight shape. Shown in FIG. 6 are virtual lines L, each virtual line L passing through a point of the drive pin 43b from the swing center C.

The edge portion 33b2 and the side surface 43b2 are positioned at the start end side in the swing direction of the drive lever 40b in the exposure operation. The edge portion 33b1 and the side surface 43b1 are positioned at the terminal end side in the swing direction of the drive lever 40b in the exposure operation. The edge portions 33b2 and 33b1 are an example of first and second edge portions, respectively. The side surfaces 43b2 and 43b1 are an example of first and second side surfaces, respectively. In the exposure operation, the drive lever 40b and the arm 31b swing while the edge portion 33b1 linearly abuts the side surface 43b1. In the charge operation, the drive lever 40b and the arm 31b swing while the edge portion 33b2 linearly abuts the side surface 43b2.

Just when the swinging drive pin 43b of the drive lever 40b abuts the end portion 13b1 in the exposure operation, the inertial force causes the arm 31b to try to further swing and causes the trailing shutter 20B to try to further move. This inertial force pushes the edge portion 33b2 of the engagement hole 33b of the arm 31b to the side surface 43b2 of the drive pin 43b. At this time, the edge portion 33b2 receives the reaction force F from the side surface 43b2. The direction of the reaction force F is opposite to the direction, in which the inertia force exerts on the arm 31b when the drive pin 43b abuts the end portion 13b1.

This reaction force F is resolved into a component force A perpendicular to the edge portion 33b2 and the side surface 43b2 and a component force B parallel thereto. This is because the edge portion 33b2 and the side surface 43b2 are inclined by a predetermined angle θ with respect to the direction of the reaction force F. The angle θ is between the direction, perpendicular to a line passing through the swing center C and the center of the side surface 43b2, and the normal direction, at the center of the side surface 43b2. Here, the component force A, smaller than the reaction force F, exerts in such a direction as to deform the edge portion 33b2 and to expand the engagement hole 33b. In addition, the component force B almost does not influence the deformation of the edge portion 33b2 because the component force B exerts thereon in the direction parallel thereto.

The component forces A and B are calculated by the following expressions (1) and (2), respectively.

A=FX cos θ  expression (1)

B=FX sin θ  expression (2)

For example, when the angle θ is 45 degrees, the component force A is about 0.7 times the reaction force F in magnitude. Also, as for the angle θ, an angle between a line, passing through the swing center C and the center of the side surface 43b2, and the side surface 43b2 is indicated by 90°−θ.

Figure 7:
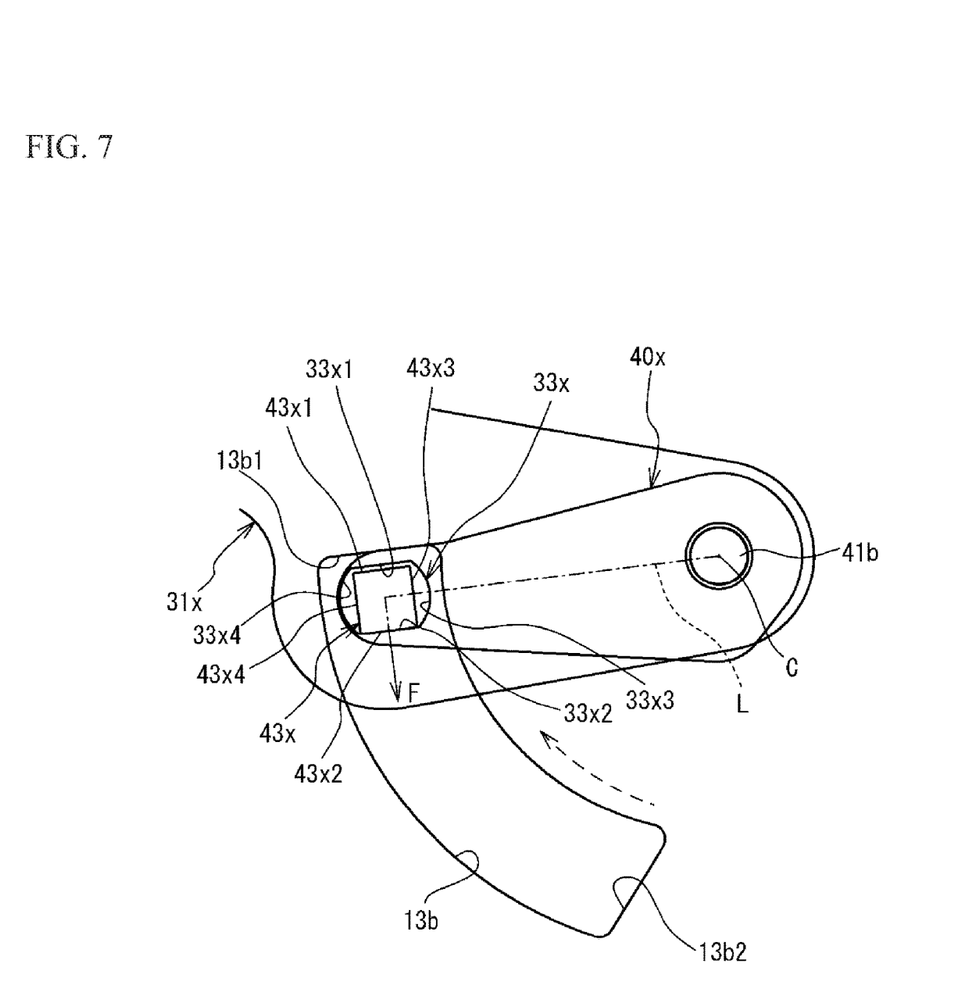
FIG. 7 is a view of a comparative example.

FIG. 7 is a view of a comparative example. As for the comparative example, similar components of the present embodiment are designated with similar reference numerals and a description of those components will be omitted. The drive pin 43x has a substantially quadrangular shape when viewed in the axial direction, and has side surfaces 43x1 to 43x4. An engagement hole 33x of the arm 31x through which a drive pin 43x penetrates has edge portions 33x1 to 33x4 respectively facing the side surfaces 43x1 to 43x4. The edge portions 33x3 and 33x4 have an arc shape. The edge portions 33x1 and 33x2 have a linear shape. The side surface 43x2 and the edge portion 33x2 are parallel to a virtual line L (as shown in FIG. 6) passing through the center of the drive pin 43x from the swing center C.

Just when the drive pin 43x abuts the end portion 13b1 and the drive lever 40x stops, the inertial force pushes the edge portion 33x2 of the engagement hole 33x of the arm 31x to the side surface 43x2 of the drive pin 43x. At this time, the edge portion 33x2 receives the reaction force F from the side surface 43x2. Here, the edge portion 33x2 and the side surface 43x2 are perpendicular to the direction of the reaction force F. Therefore, the reaction force F exerts on the edge portion 33x2 in the direction perpendicular thereto. As comparing the present embodiment in FIG. 6 with the comparative example in FIG. 7, the reaction force F smaller than the component force A exerts on the edge portion 33b2 in the direction perpendicular thereto in the present embodiment, whereas the reaction force F exerts on the edge portion 33x2 in the direction perpendicular thereto in the comparative example.

Herein, the arms 31b and 31x are thin and are made of synthetic resin in light of the increase in the shutter speed, the decrease in weight, the decrease in manufacturing cost, and the like. Therefore, when the large reaction force F exerts on the edge portion 33x2 in the direction perpendicular thereto in the comparative example, the engagement hole 33x might be deformed and expanded. When the engagement hole 33x is expanded, a clearance between the engagement hole 33x and the drive pin 43x is expanded, so that there is possibility to increase the period from when the drive lever 40x starts rotating to when the drive pin 43x abuts the edge of the engagement hole 33x and the arm 31x starts moving. This might increase the period from when the drive lever 40x starts moving to when the trailing shutter 20B starts moving, so the variation in the exposure period might deteriorate.

In this embodiment, the component force A exerting on and expanding the engagement hole 33b is smaller than the reaction force F, so the edge portion 33b2 is suppressed from being deformed, and the engagement hole 33b is suppressed from being expanded. This suppresses the deterioration of the variation in the exposure period.

For example, this may eliminate a buffering member that abuts the arm 31b and absorbs the impact of the arm 31b when the arm 31b stops at the terminal end position of the swinging range of the arm 31b in the exposure operation. This can reduce the number of parts. Alternatively, a small buffer member may be used. This can suppress the manufacturing cost.

Preferably, the angle θ illustrated in FIG. 6 is equal to or more than 30 degrees and equal to or less than 60 degrees. This is because the component force A can be smaller in a case where the angle θ is equal to or more than 30 degrees than in a case where the angle θ is less than 30 degrees. This is also because, in a case where the angle θ is 61 degrees or more, the edge portion 33b2 might slide on the side surface 43b2 and the arm 31b might overrun when the drive lever 40b stops at the terminal end position of the swing range.

In addition, the edge portion 33b2 and the side surface 43b2 may be anything as long as they are not parallel to or perpendicular to any one of plural virtual lines L passing through the drive pin 43b from the swing center C. This is because, in this case, the reaction force F exerting on the edge portion 33b2 can be resolved into the component force perpendicular to the edge portion 33b2 and the component force parallel thereto.

Also, in this embodiment, the side surface 43b2 faces the reverse side of the swing center C of the drive lever 40b, but may face the swing center C side. Further, the drive lever 40a and the arm 31a may be configured similarly to the drive lever 40b and the arm 31b.

Figure 8:
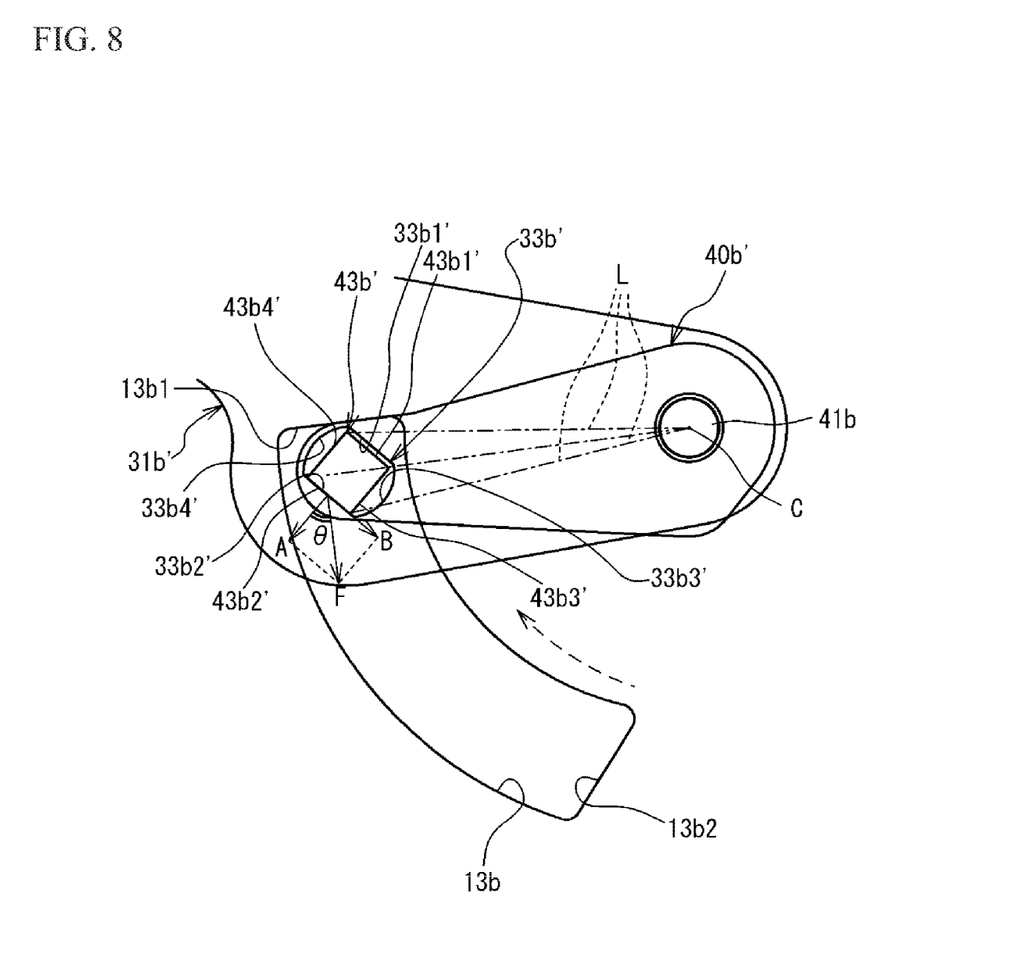
FIG. 8 is a view of a variation.
Figure 9:
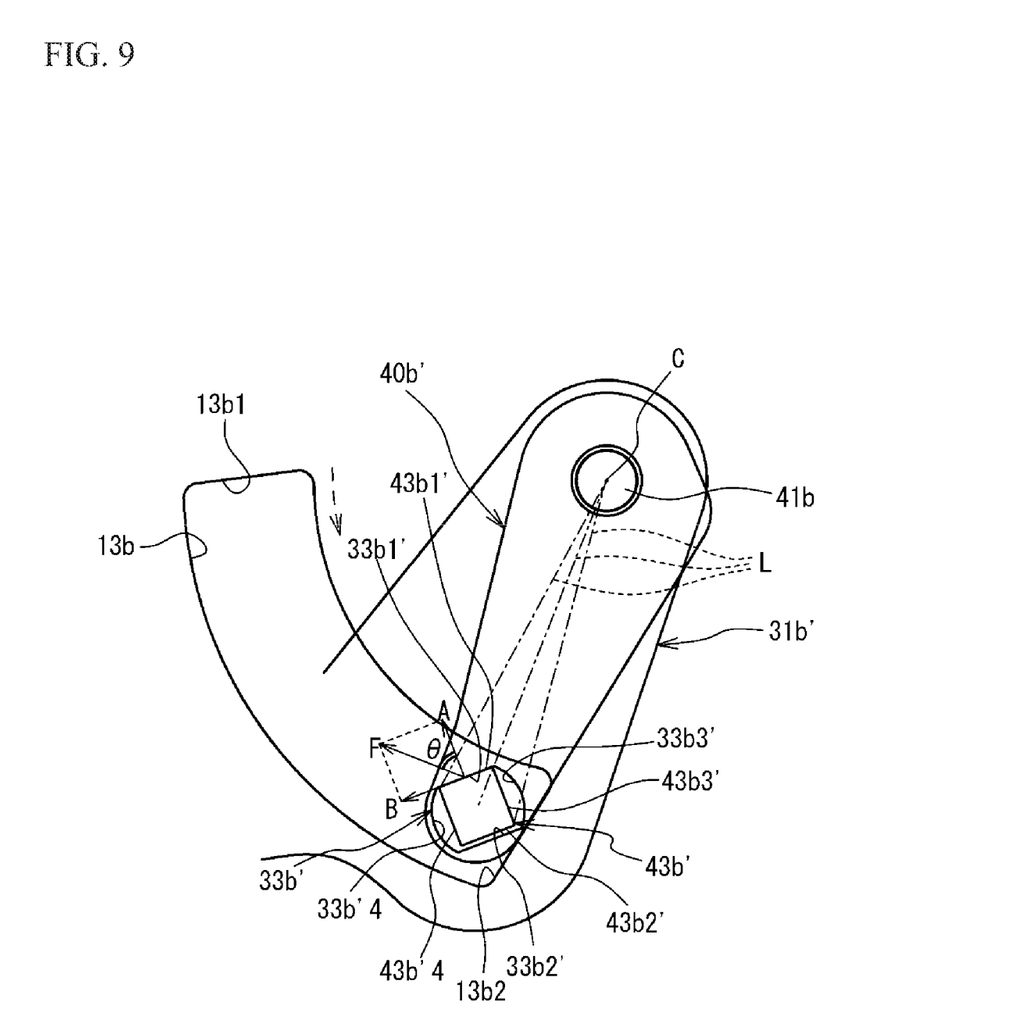
FIG. 9 is a view of the variation.

FIGS. 8 and 9 are views of a variation. As for the variation, similar components of the present embodiment are designated with similar reference numerals and a description of those components will be omitted. A drive pin 43b' of the drive lever 40b' has a substantially quadrangular shape when viewed in the axial direction, and has side surfaces 43b1' to 43b4' each having a linear shape. Shown in FIGS. 8 and 9 are virtual lines L, each virtual line L passing through a point of the drive pin 43b' from the swing center C. An engagement hole 33b' of an arm 31b' through which a drive pin 43b' penetrates has edge portions 33b1' to 33b4' respectively facing the side surfaces 43b1' to 43b4'. The edge portions 33b3' and 33b4' each has an arc shape. The edge portions 33b1' and 33b2' each has a linear shape. The engagement hole 33b' has an oblong hole shape.

The edge portion 33b2' and the side surface 43b2' are positioned at the start end side in the swing direction of the drive lever 40b' in the exposure operation, and at the terminal end side in the swing direction of the drive lever 40b' in the charge operation. The edge portion 33b1' and the side surface 43b1' are positioned at the terminal end side in the swing direction of the drive lever 40b' in the exposure operation, and at the start end side in the swing direction of the drive lever 40b' in the charge operation. In the exposure operation, the drive lever 40b' and the arm 31b' swing while the edge portion 33b2' linearly abuts the side surface 43b2'. In the charge operation, the drive lever 40b' and the arm 31b' swing while the edge portion 33b2' abuts the side surface 43b2'.

As illustrated in FIG. 8, in the exposure operation, just when the drive pin 43b' abuts the end portion 13b1 and the swinging drive lever 40b' stops, the edge portion 33b2' receives the reaction force F from the side surface 43b2'. However, even in the variation, the component force A smaller than the reaction force F exerts on the edge portion 33b2' in the direction perpendicular thereto, so the deformation of the edge portion 33b2' is suppressed.

FIG. 9 illustrates the reaction force F that exerts on the engagement hole 33b' when the drive lever 40b swings and the drive pin 43b' abuts the end portion 13b2 and stops in the charge operation. At this time, the inertia force pushes the edge portion 33b1' of the engagement hole 33b' of the arm 31b' to the side surface 43b1' of the drive pin 43b. At this time, the edge portion 33b1' receives the reaction force F from the side surface 43b1'. The direction of the reaction force F is opposite to the direction of the inertial force exerting on the arm 31b' when the drive pin 43b' abuts the end portion 13b2. The reaction force F is resolved into the component force A perpendicular to the edge portion 33b1' and the side surface 43b1' and the component force B parallel thereto. Also, in this case, since the component force A smaller than the reaction force F exerts on the edge portion 33b1' in the direction perpendicular thereto, the deformation of the edge portion 33b1' is suppressed. In this way, the variation suppresses the deformation of the edge portions 33b1' and 33b2' of the engagement hole 33b'. This suppresses the deterioration of the variation in the exposure period.

This may eliminate, for example, a buffer member that absorbs the impact of the arm 31b by abutting the arm 31b when the arm 31b stops at the end position of the swinging range of the arm 31b' in the charge operation. This can reduce the number of parts. Alternately, a small buffer member may be used. This can suppress the manufacturing cost.

In addition, the edge portion 33b1' and the side surface 43b1' may be anything as long as they are not perpendicular to or parallel to any one of plural virtual lines L that passes through the drive pin 43b' from the swing center C of the drive lever 40b'. This is because, in this case, the reaction force F exerting on the edge portion 33b1' can be resolved into the component force perpendicular to the edge portion 33b1' and the component force parallel thereto.

In addition, the edge portion 33b2 may have an arc shape, and the side surface 43b2 may be curved corresponding to this. In this case, this is because the reaction force F exerting on the contact point of the edge portion 33b2 and the side surface 43b2 can be resolved into the component force perpendicular to the tangential line passing through the contact point and the component force parallel thereto.

The drive lever 40a and the arm 31a may also have the same structure as the drive lever 40b' and the arm 31b'.

In the present embodiment, the actuators 70a and 70b respectively drive the leading shutter 20A and the trailing shutter 20B. However, the present invention is not limited to this arrangement. For example, an electromagnet and a spring may function as driving the drive lever and the shutter. In this case, the drive lever is provided with an iron piece absorbed to the electromagnet, and the drive lever is biased by the spring to move away from the electromagnet. In the state where the iron piece of the drive lever is absorbed to the electromagnet, the energization state of the electromagnet is changed. As a result, the iron piece moves away from the electromagnet and the drive lever swings away from the electromagnet in accordance with the biasing force of the spring.

While the preferred embodiments of the present invention have been illustrated in detail, the present invention is not limited to the above-mentioned embodiments, and other embodiments, variations and modifications may be made without departing from the scope of the present invention.

The focal-plane shutter according to the present embodiment can be employed in an optical device such as a still camera or a digital camera.

In the above embodiment, the leading shutter and the trailing shutter are each composed of three blades, but not limited to these arrangements. The leading shutter and the trailing shutter may be each composed of two to five blades.

The invention claimed is:

1. A focal-plane shutter comprising:
a board including an opening;
a shutter opening and closing the opening;
a drive lever provided with a drive pin and swinging;
a drive arm provided with an engagement hole engaged with the drive pin, swinging about a center same as a swing center of the drive lever, driving the shutter, and made of a synthetic resin; and
a restriction portion defining a swinging range of the drive lever,
wherein
the engagement hole includes:
 a first edge portion at a start end side from which the drive lever moves in a predetermined direction; and
 a second edge portion at a terminal end side to which the drive lever moves in the predetermined direction,
the drive pin includes first and second side surfaces respectively capable of abutting the first edge portion and the second edge portion, and
the first edge portion and the first side surface are not parallel to or perpendicular to any one of virtual lines capable of passing from the swing center to the drive pin when viewed in an axial direction of the swing center.

2. The focal-plane shutter of claim 1, wherein the first side surface faces a reverse side of the swing center.

3. The focal-plane shutter of claim 1, wherein the first side surface faces the swing center side.

4. The focal-plane shutter of claim 1, wherein the second edge portion and the second side surface are not parallel to or perpendicular to any one of virtual lines capable of passing from the swing center to the drive pin when viewed in an axial direction of the swing center.

5. The focal-plane shutter of claim 1, wherein an angle between a direction, perpendicular to a line passing through the swing center and a center of the first side surface, and a normal line, at the center of the first side surface, is equal to or more than 30 degrees and equal to or less than 60 degrees.

6. An optical device comprising a focal-plane shutter comprising:
a board including an opening;
a shutter opening and closing the opening;
a drive lever provided with a drive pin and swinging;
a drive arm provided with an engagement hole engaged with the drive pin, swinging about a center same as a swing center of the drive lever, driving the shutter, and made of a synthetic resin; and
a restriction portion defining a swinging range of the drive lever,
wherein
the engagement hole includes:
 a first edge portion at a start end side from which the drive lever moves in a predetermined direction; and
 a second edge portion at a terminal end side to which the drive lever moves in the predetermined direction,
the drive pin includes first and second side surfaces respectively capable of abutting the first edge portion and the second edge portion, and
the first edge portion and the first side surface are not parallel to or perpendicular to any one of virtual lines capable of passing from the swing center to the drive pin when viewed in an axial direction of the swing center.

* * * * *